United States Patent [19]
Brembs

[11] 3,748,566
[45] July 24, 1973

[54] STEPPING MOTOR WITH COMPENSATED ANGULAR ERROR

[75] Inventor: Peter Brembs, Heusenstamm, Germany

[73] Assignee: Licentia Patent-Verwaltungs-G.m.b.H., Frankfurt, Germany

[22] Filed: Feb. 25, 1971

[21] Appl. No.: 118,643

[30] Foreign Application Priority Data
Feb. 28, 1970 Germany .................. P 20 09 558.3

[52] U.S. Cl. ................................. 318/685, 318/696
[51] Int. Cl. ............................................. G05b 19/40
[58] Field of Search ................... 318/630, 601, 602, 318/619

[56] References Cited
UNITED STATES PATENTS

| | | | |
|---|---|---|---|
| 3,541,418 | 11/1970 | Agin et al. | 318/685 X |
| 3,418,547 | 12/1968 | Dudler | 318/685 X |
| 3,427,442 | 2/1969 | Sklaroff | 318/601 X |
| 3,378,741 | 4/1968 | Sutton | 318/602 X |
| 3,586,953 | 6/1971 | Markkanen | 318/685 |
| 3,575,653 | 4/1971 | Gucwa | 318/685 |
| 3,423,658 | 1/1969 | Barrus | 318/696 |
| 3,353,076 | 11/1967 | Haines | 318/696 |
| 3,418,547 | 12/1968 | Dudler | 318/685 |
| 3,370,289 | 2/1968 | Hedgcock et al. | 318/685 |
| 3,399,753 | 9/1968 | Revelle | 318/685 |
| 3,419,800 | 12/1968 | Levi et al. | 318/685 |
| 3,660,746 | 5/1972 | Milek | 318/696 |
| 3,668,494 | 6/1972 | Agin | 318/561 |
| 1,960,350 | 5/1934 | Shackleton et al. | 318/685 |

Primary Examiner—C. R. Simmons
Attorney—Spencer & Kaye

[57] ABSTRACT

Compensation for the angular error of an electric stepping motor is provided by generating an electrical error signal whenever the rotor of the stepping motor deviates from a selected stepping position and then utilizing this error signal to correct or adjust the individual winding currents being supplied to the motor to cause the rotor to correctly position itself at the selected stepping position. The error signal is preferably derived, e.g., optically, from a pair of control tracks which are scanned and the signals combined to form a difference signal. The difference signal is in turn applied to switching amplifiers, which are digitally controlled between their on and off positions to selectively provide the winding currents for the motor to cause the rotor thereof to move to a selected stepping position, so as to correct the output current of the switching amplifier to compensate for the angular error.

8 Claims, 5 Drawing Figures

Inventor:
Peter Brembs

Inventor:
Peter Brembs
Spencer & Kaye
BY  ATTORNEYS.

STEPPING MOTOR WITH COMPENSATED ANGULAR ERROR

BACKGROUND OF THE INVENTION

The present invention relates to electrical stepping motors and more particularly to a method and apparatus for providing compensation for the angular error in a stepping motor.

The use of stepping motors in the measuring, control and regulating art is well known. For example, as shown in "Werkstatt und Betrieb" 101, 1968, pages 597–602, and "Elektronik" 16, 1967, Issue 1, pages 1–6, the exchangeable template in a light tracing head, which template has up to 100 different symbols, is rotated by a stepping motor.

Stepping motors, however, have an angular error which is caused primarily by the permitted fabrication tolerances. For uses requiring extreme accuracy, such as for example in the abovementioned application of a stepping motor, the resulting angular error of conventionally constructed stepping motors may be too large. In order to reduce the angular error for such special applications, special types of stepping motors or stepping motors constructed according to very tight tolerances must be utilized, resulting in a greatly increased cost.

SUMMARY OF THE INVENTION

It is, therefore, the object of the present invention to permit the use of normal, conventional stepping motors for applications requiring a minimum angular error by providing compensation for the angular error whereby it is reduced.

Since the angular position in a stepping motor results from the balance of a plurality of magnetic fields in the motor, which fields are produced, for example, by permanent magnets and by the individual motor windings, it is possible to influence the angular position of a stepping motor by changing the individual winding currents. Accordingly, the above object is accomplished, according to the present invention in that when the angular position of the stepping motor deviates from its rated or selected stepping position, an electrical error signal is derived from this deviation which corrects the winding current of the motor.

According to a preferred embodiment of the invention the electrical analog error signal is derived by means of an optical position discriminator including at least one and preferably two control tracks provided on a disc mounted on the rotor of the stepping motor and a pair of light sensitive scanning devices responsive to the control tracks for providing error signals which are 180° out of phase. The output signals from the scanning devices are combined to form a difference signal which is then utilized to correct the current in the individual motor windings so as to cause the angular error to be reduced and the rotor to be moved to the selected position.

According to a further feature of the invention the currents for the individual windings are provided by individual switching amplifiers which are digitally controlled between their on and off positions so as to selectively supply currents to the windings in accordance with the selected stepping position. The difference signal from the position discriminator is then fed to the switching amplifiers so that it will correct the output current of the amplifier which is turned on.

DESCRIPTION OF THE PREFERRED EMBODIMENTS

Figure 1:
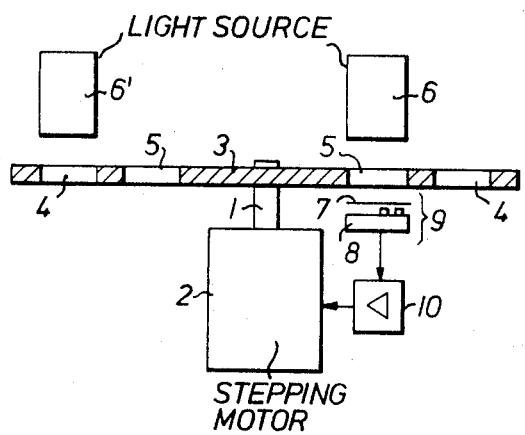
FIG. 1 is a block diagram of a stepping motor for use with a light tracing head which is provided with an angular error compensating arrangement according to the invention.

Referring now to FIG. 1, there is shown a conventional stepping motor 2 having a template disc 3 mounted directly on the rotor shaft 1 thereof. The disc 3 is provided with a region 4 bearing symbols, such as numbers, letters and other characters from various fields which are not shown in detail. In its region 5, the disc 3 bears at least one, and preferably two, control tracks 11 and 12 as shown with an enlarged scale in FIG. 2. As can also be seen in FIG. 1, illumination devices 6, 6' are disposed above the light-permeable template disc 3 in the regions 4 and 5. Adjacent the region 5, a scanning device 9, including a scanning slit 7 and, photosensitive elements 8, e.g., photodiodes, is disposed below disc 3. The output voltage of the scanning device 9 controls an amplifier 10, which will be described in detail in connection with FIG. 3, whose output is an error signal which is utilized to influence and correct the winding currents of the stepping motor 2.

Figure 2:
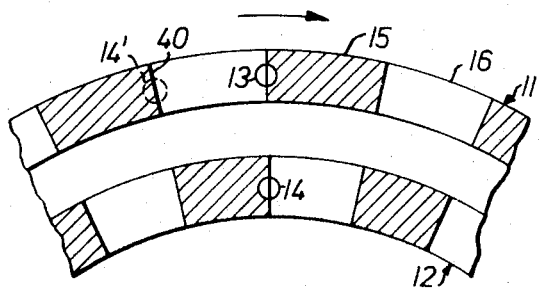
FIG. 2 is a sectional plan view of the template disc driven by the stepping motor of FIG. 1.

As shown in FIG. 2, the control tracks 11, 12 provided in order to generate the error signal for compensating the angular error are phase-shifted by 180° with respect to each other. Track 11 is scanned by a photodiode 13 indicated schematically by a circle while track 12 is scanned by a photodiode 14 which is similarly indicated by a circle. Tracks 11, 12 consist of alternating opaque and light-permeable or light transmissive sections 15, 16, respectively, which are very precisely applied to the surface of the disc 3. The number of sections 15, 16 per track is equal to the number of angular steps of the stepping motor per revolution. As illustrated, the diodes 13 and 14 are positioned relative to their associated track so that when the stepping motor is accurately positioned at a selected stepping position, the diodes will be adjacent a transition point or edge between an opaque section 15 and a light permeable section 16 whereby the output from each diode will be the same.

Figure 3:
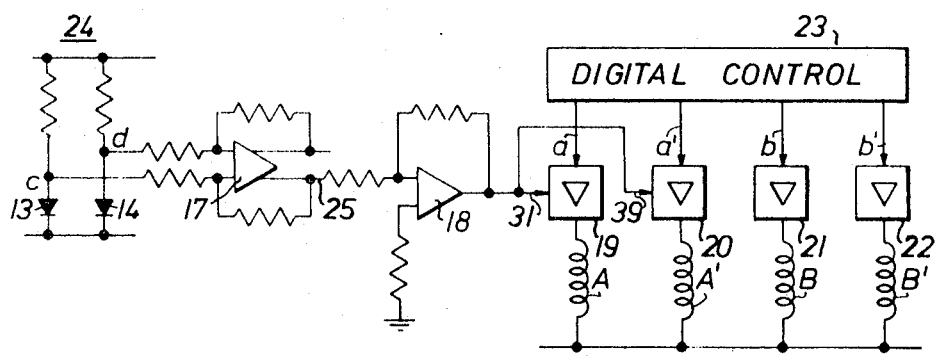
FIG. 3 is a schematic diagram illustrating the electrical circuit employed in the embodiment of FIG. 1 for compensating the angular error.

As can be seen in FIG. 3, the photodiodes 13, 14 are connected in separate arms of a bridge circuit 24 whose diagonal points $c, d$ are connected to the inputs of a differential amplifier 17. The output 25 of amplifier 17 is connected to the input of an operational amplifier 18 whose output is utilized to influence the currents in the individual windings of the stepping motor. In the illustrated case, the stepping motor has four windings $A$, $A'$, $B$, $B'$ the currents in which are controlled by switching amplifiers 19-22, respectively. The switching of the amplifiers 19 to 22 between their on and off conditions is controlled by signals applied at the inputs $a$, $a', b, b'$, respectively from a digital circuit 23. With this type of control arrangement the output signal from amplifier 18 is utilized to influence the currents in only two of the windings, i.e., A or A' and hence is connected only to the amplifiers 19 and 20.

In the control arrangement here described for a four-phase stepping motor with a permanent magnet armature it is necessary that only the winding which carries current is influenced by the correction signal since only then will the sign of the correction be correct, i.e., the rotor of the stepping motor will be turned in the proper direction. This is because of the fact that an increase in the current, for example, of one winding can effect a rotation in a clockwise direction or in counter-clockwise direction depending on the position of the rotor of the motor within its period of four steps.

The operation of the embodiment of FIG. 3 will now be explained in detail.

If the rotor of the stepping motor is in its rated or selected stepping position, the photodiodes 13, 14 (FIG. 2) will, as indicated above, be illuminated to the same degree. Since the photodiodes 13, 14 are branches of a bridge circuit 24, no signal will appear at the diagonal points $c, d$ of the bridge. Consequently, since no difference signal appears at the input of the differential amplifier 17, no signal is emitted at the output 25 of the amplifier 17.

If now the rotor of the stepping motor is not in its rated position and an angular displacement occurs, for example, in the direction of the arrow in FIG. 2, the photodiode 13 will be illuminated to a greater degree than the photodiode 14. Thus a difference voltage appears across the diagonal points $c, d$, of the bridge circuit 24 which also acts on the input of the differential amplifier 17. At the output 25 of the amplifier there thus appears a correction signal which is fed to the winding A or A' of the motor via the switching amplifier 19 or 20, causing the motor shaft to turn so as to reduce the displacement error.

In order to effect movement of the rotor of the stepping motor, the switching amplifiers 19, 20 are controlled by affirmative digital signals at their inputs $a, a'$, respectively, and the switching amplifiers 21, 22 are controlled at their inputs $b, b'$, respectively by negated digital signals which are phase shifted by 90° with respect to the signals at inputs $a, a'$. These signals are present in the form of pulse trains and are emitted by the digital control 23 in a conventional manner. The four amplifiers 19 to 22 thus switch the winding currents of the stepping motor between on and off conditions.

To compensate for the angular error, the present invention now provides that the switching amplifiers 19, 20 for motor windings A, A' are additionally provided with the analog correction signal from the amplifier 18. This correction signal effects an analog change of the respective winding current but only when the associated switching amplifier is switched on. If the winding current is digitally switched off, i.e., when the switching amplifier is not switched on by the digital signal from circuit 23, the analog correction signal is blocked and thus also does not become effective.

The windings of the motor are thus digitally controlled and when the winding current is switched on and the position of the rotor of the stepping motor deviates from the rated value, the winding current is automatically subjected to an analog correction.

Figure 4:
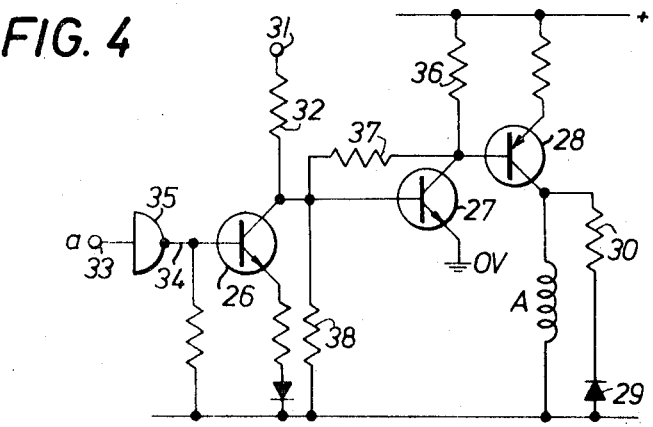
FIG. 4 is a more detailed schematic diagram of the switching amplifiers employed in the circuit of FIG. 3.

FIG. 4 shows a more detailed embodiment of the switching amplifiers 19–22. It is assumed that the illustated amplifier represents switching amplifier 19 which influences the current in winding A.

The illustrated switching amplifier includes three transistors 26, 27 and 28 connected in cascade. To protect the transistor 28 a diode 29 and a resistor 30 are connected in parallel with winding A. The conduction of transistor 28 and thus the current through winding A is controlled by transistor 27 to which is connected transistor 26 which is controlled by the digital signal train from control device 23 applied at input 33. Transistor 27 is also controlled by the analog correction signal from amplifier 18 via an input 31 and a resistor 32. However, the digital signal from the control device 23 appearing at input 33 is effective to switch the current flowing through winding A either on or off.

The amplifier of FIG. 4 operates as follows:

When a logic signal L appears at input 33, a signal 0 will appear at the output 34 of NOT stage 35. The potential of this signal is such that the input transistor 26 is blocked (negative potential). The high collector potential of transistor 26 causes the connected transistor 27 and thus also output transistor 28 to become conductive. The amplifier circuit is so designed that transistor 27 tunes itself to a center (average) operating point of its characteristic, which is effected by the voltage divider circuit formed by resistors 36, 37 and 38. In addition to the digital control by transistor 26, transistor 27 is linearly controlled by the analog correction voltage provided at input 31 by the amplifier 18 (FIG. 3). This correspondingly changes the current flowing through winding A.

If conversely a logic signal 0 appears at input 33, the NOT stage 35 emits a signal L. The input transistor 26 thus becomes conductive causing transistor 27 to be blocked. Any analog correction voltage present at input 31 thus has no influence on transistor 27. Moreover, due to the fact that the transistor 27 is non-conductive, the output transistor 28 is also blocked and thus no current flows through winding A.

The amplifier arrangement according to FIG. 4 thus permits switching the winding current on and off in dependence on a digital input signal and to additionally switch on an analog correction when and only when the current is digitally switched on.

In the embodiment illustrated in FIG. 3, the switching amplifiers 21, 22 may be any known type switching amplifiers. Alternatively, these amplifiers 21 and 22 may be constructed as shown in FIG. 4, but with input 31 and resistor 32 being eliminated.

Figure 5:
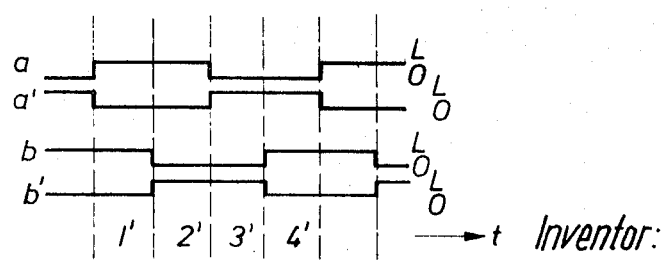
FIG. 5 is a signal diagram illustrating the digital control of the switching amplifiers of the circuit of FIG. 3.

The reason why the analog correction signal provided by amplifier 18 need only be fed to switching amplifiers 19, 20 in the embodiment of the invention illustrated in FIG. 3 will now be explained in detail with the aid of the digital signal diagram of FIG. 5. In the signal diagram the signal trains emitted by the digital control 23 (FIG. 3) for the stepping motor are illustrated. These signal trains act on the switching amplifiers 19 to 22 (FIG. 3).

In time position 1' signals L act only on inputs $a, b$. Thus only windings A, B carry current. Depending on the sign of the correction signal which may be present at the input 31 of switching amplifier 19, only the current in winding A is increased or decreased thus producing a clockwise or counterclockwise turn. The same analog signal at the input 39 of switching amplifier 20 has no influence on this amplifier since — as can be seen in the signal diagram of FIG. 5 — the digital signal at the input $a'$ is 0 in position 1' and thus the switching amplifier 20 is switched off and winding A' carries no current. The analog correction signal thus is ineffective to produce any current change in winding A'.

In time position 2', a signal L is again effective at input $a$ of switching amplifier 19 and a signal L is present at input $b'$ of switching amplifier 22. Thus only windings A and B' carry current. An analog correction signal possibly present again at input 31 of switching amplifier 19 can change the current only in winding A corresponding to the present angular error. As can be seen in the signal diagram, the switching amplifier 20 remains switched off because of the presence of the logic signal 0 at the input $a'$.

In time position 3', logic signals L are effective only at inputs $a'$ and $b'$ of switching amplifiers 20 and 22, respectively and thus only windings A' and B' carry current. An analog correction signal present at input 39 of amplifier 20 is thus able to influence the current flowing in winding A'. Since a signal 0 is present at input a (33) of switching amplifier 19, the analog correction signal present at input 31 has no effect.

In time position 4' signals L are effective only at inputs $a'$ and $b$ of switching amplifiers 20 and 21, respectively. Thus only windings A' and B carry current. An analog correction signal present at input 39 is able to influence the current through winding A' via switching amplifier 20. Since a signal 0 is present at the input $a$ of the switching amplifier 19, this switching amplifier is switched off and the analog correction signal present at its input 31 has no influence on it.

Thus, with a winding arrangement wherein the four motor windings are arranged in pairs A, A' and B, B' with two windings, one from each pair, carrying current for each of the desired stepping positions, the desired correction can be achieved most simply by only allowing the correction signal to influence one pair of the motor windings, i.e., the windings A, A' in the illustrated embodiment.

It is to be understood, however, the present invention is not limited to stepping motors with four windings, two of which carry current. It is further to be understood that it is also possible to employ only a single control track such as shown in FIG. 2 with only a single photodiode as the scanning means. The advantage of the double scanning shown in FIG. 2 is, however, that the difference circuit prevents fluctuations in the brightness of the lamps or the temperature of the photodiode from influencing the system.

A double scanning according to the above-described principle is also possible with only one control track. In such an arrangement, one photo diode being disposed adjacent the control track 11 in the manner of photodiode 13 (FIG. 2), whereas a second photodiode 14' is disposed at any other point of control track 11 for scanning the rear edge 40 of an opaque section 15.

Instead of the photodiodes it is also possible to utilize phototransistors, photoelements or similar photoelectric semi-conductors.

The present invention provides the further advantage that the compensation of the angular displacement error by an analog control of the winding currents counteracts the usual pendulum action of the stepping motor when it is stopped, i.e. it damps the motor. This pendulum action is very undesirable and the stepping motor must often times be provided with very complicated mechanical damping devices which are made unnecessary by the present invention.

It will be understood that the above description of the present invention is susceptible to various modifications, changes and adaptations, and the same are intended to be comprehended within the meaning and range of equivalents of the appended claims.

I claim:

1. In combination with an electrical stepping motor, means for compensating and correcting the angular error of said motor after it has been stepped to a selected stepping position comprising:

means for providing an electrical analog signal whenever the angular position of the rotor of said stepping motor deviates from the desired absolute angular position at the selected stepping position and, means responsive to said electrical signal for adjusting the analog valve of the current then being supplied to the individual motor windings to cause said rotor to move to said desired absolute angular position.

2. The apparatus defined in claim 1 wherein said means for providing an electrical analog signal comprises:

a disc mounted on said rotor and having at least one control track thereon whose information is related to the desired absolute angular positions of said motor;

at least one scanning device responsive to the signal from said control track; and circuit means responsive to the output of said scanning device for providing an electrical analog signal related thereto.

3. The apparatus as defined in claim 2 wherein two of said scanning means are provided adjacent said disc and responsive to the control track for providing signals 180° out of phase; and wherein said circuit means responsive to the output of said scanning means includes a difference circuit for providing an output signal proportional to the difference between the output signals of said two scanning means.

4. The apparatus as defined in claim 3 wherein said disc contains a pair of control tracks whose signals are 180° out of phase, and each of said scanning means is associated with one of said tracks.

5. The apparatus as defined in claim 3 wherein said control tracks include alternate light transmissive and opaque areas; wherein each of said scanning devices is a photo-sensitive element which is positioned relative to its associated control track so that it is adjacent a transition point from a light transmissive to an opaque area thereof when said rotor is properly positioned at a desired absolute angular position at a selected stepping position, and wherein said difference circuit includes a bridge circuit with each of said photosensitive elements being in a separate arm thereof.

6. The apparatus as defined in claim 5 wherein: the output of said bridge circuit is fed to the input of a difference amplifier; each of said motor windings is connected to a separate switching amplifier which when selectively turned on supplies current to the associated motor windings; digital control means are provided for selectively switching said switching amplifiers between their on and off states in accordance with a desired stepping position; and, the output of said difference amplifier is connected to an input of selected ones of said switching amplifiers so as to impose a correction current corresponding to said electrical analog signal on the output thereof.

7. The apparatus as defined in claim 6 wherein said stepping motor has four windings arranged in two pairs of windings, wherein said digital control means controls said switching amplifiers so that one winding of each pair of windings is provided with current for each desired stepping position; and wherein the output signal of said difference amplifier is connected to only the switching amplifiers associated with one of said pair of windings.

8. A method of compensating for the angular error of an electrical stepping motor after it has been stepped to a selected stepping position comprising:
providing an electrical analog error signal whenever the angular position of the rotor deviates from the desired absolute angular position at a selected stepping position; and
utilizing said electrical signal to adjust the analog value of the winding current then being supplied to said motor to cause the rotor to be moved to the desired absolute angular position.

* * * * *